United States Patent [19]
Brown et al.

[11] Patent Number: 5,837,758
[45] Date of Patent: *Nov. 17, 1998

[54] COMPOSITIONS OF POLY (PHENYLENE ETHER), POLY (ARYLENE SULFIDE) AND ORTHO ESTER COMPOUNDS

[75] Inventors: Sterling Bruce Brown, Schenectady, N.Y.; Chorng-Fure Robin Hwang, Cary, N.C.; Steven Thomas Rice, Scotia, N.Y.; James Joseph Scobbo, Jr., Slingerland, N.Y.; John Bennie Yates, III, Glenmont, N.Y.; Farid F. Khouri, Clifton Park, N.Y.

[73] Assignee: General Electric Company, Pittsfield, Mass.

[*] Notice: The term of this patent shall not extend beyond the expiration date of Pat. No. 5,504,165.

[21] Appl. No.: 687,263

[22] Filed: Jul. 25, 1996

Related U.S. Application Data

[63] Continuation of Ser. No. 485,759, Jun. 7, 1995, abandoned.

[51] Int. Cl.⁶ ............................ C08L 71/12; C08L 81/02
[52] U.S. Cl. ................... 524/108; 525/133; 525/390; 525/391; 525/537
[58] Field of Search ................... 525/133, 390, 525/391, 537; 524/108

[56] References Cited

U.S. PATENT DOCUMENTS

| | | | |
|---|---|---|---|
| 4,021,596 | 5/1977 | Bailey | 428/375 |
| 4,451,607 | 5/1984 | Garcia et al. | 524/494 |
| 4,476,284 | 10/1984 | Clearly | 525/92 |
| 4,528,346 | 7/1985 | Sugie et al. | 525/523 |
| 4,704,448 | 11/1987 | Brugel | 528/125 |
| 4,889,893 | 12/1989 | Kobayashi et al. | 525/189 |
| 5,001,201 | 3/1991 | Brown | 525/390 |
| 5,047,465 | 9/1991 | Auerbach | 524/504 |
| 5,122,578 | 6/1992 | Han et al. | 525/537 |
| 5,132,373 | 7/1992 | Khouri et al. | 525/390 |
| 5,142,049 | 8/1992 | Khouri et al. | 544/218 |
| 5,162,433 | 11/1992 | Nishio et al. | 525/66 |
| 5,212,255 | 5/1993 | Khouri et al. | 525/391 |
| 5,227,429 | 7/1993 | Kawamura et al. | 525/537 |
| 5,231,132 | 7/1993 | Khouri | 525/397 |
| 5,247,006 | 9/1993 | Khouri et al. | 524/508 |
| 5,290,881 | 3/1994 | Dekkers | 525/397 |
| 5,292,789 | 3/1994 | Ishida et al. | 524/320 |
| 5,324,796 | 6/1994 | Han | 525/474 |
| 5,393,833 | 2/1995 | Khouri | 525/64 |
| 5,504,165 | 4/1996 | Brown et al. | 525/537 |

FOREIGN PATENT DOCUMENTS

| | | |
|---|---|---|
| 0 104 543 A1 | 4/1984 | European Pat. Off. |
| 0 225 144 B1 | 6/1987 | European Pat. Off. |
| 0 228 268 B1 | 7/1987 | European Pat. Off. |
| 0 341 421 A2 | 4/1989 | European Pat. Off. |
| 0 341 422 A2 | 7/1989 | European Pat. Off. |
| 0 341 422 A2 | 11/1989 | European Pat. Off. |
| 0 360 544 A2 | 3/1990 | European Pat. Off. |
| 0 368 413 A2 | 5/1990 | European Pat. Off. |
| 0 394 933 A3 | 10/1990 | European Pat. Off. |
| 0 405 135 A1 | 1/1991 | European Pat. Off. |
| 0 407 216 A1 | 1/1991 | European Pat. Off. |
| 0 438 051 A3 | 7/1991 | European Pat. Off. |
| 0 438 777 A3 | 7/1991 | European Pat. Off. |
| 0 475 040 A2 | 7/1991 | European Pat. Off. |
| 0 472 913 A2 | 3/1992 | European Pat. Off. |
| 0 472 960 A3 | 3/1992 | European Pat. Off. |
| 0 475 038 A2 | 3/1992 | European Pat. Off. |
| 0 479 560 A2 | 4/1992 | European Pat. Off. |
| 0 506 006 2 | 9/1992 | European Pat. Off. |
| 524705-A2 | 1/1993 | European Pat. Off. |
| 0 549 977 A1 | 7/1993 | European Pat. Off. |
| 0 732 367 A2 | 3/1996 | European Pat. Off. |
| 50156561-A | 12/1975 | Japan. |
| 60053562-A | 3/1985 | Japan. |
| 61021156-A | 1/1986 | Japan. |
| 62-65351 | 3/1987 | Japan. |
| 63-97662 | 4/1988 | Japan. |
| 63205358-A | 8/1988 | Japan. |
| 01031862-A | 2/1989 | Japan. |
| 1-213360 | 8/1989 | Japan. |
| 1-213361 | 8/1989 | Japan. |
| 1-240566 | 9/1989 | Japan. |
| 01259060-A | 10/1989 | Japan. |
| 1-266160 | 10/1989 | Japan. |
| 2-75656 | 3/1990 | Japan. |
| 02155951-A | 6/1990 | Japan. |
| 2-252761 | 10/1990 | Japan. |
| 03126761-A | 5/1991 | Japan. |
| 3-121159 | 5/1991 | Japan. |
| 3-126761 | 5/1991 | Japan. |
| 3-153757 | 7/1991 | Japan. |
| 3205452-A | 9/1991 | Japan. |
| 3-244661 | 10/1991 | Japan. |
| 3-265661 | 11/1991 | Japan. |
| 4-59870 | 2/1992 | Japan. |
| 4-59871 | 2/1992 | Japan. |
| 4096972-A | 3/1992 | Japan. |
| 4-122770 | 4/1992 | Japan. |
| 04132766-A | 5/1992 | Japan. |
| 4-130158 | 5/1992 | Japan. |
| 4-198268 | 7/1992 | Japan. |
| 04211926-A | 8/1992 | Japan. |
| 04213358-A | 8/1992 | Japan. |
| 4-211927 | 8/1992 | Japan. |
| 4-213358 | 8/1992 | Japan. |
| 04259540-A | 9/1992 | Japan. |
| 4264163-A | 9/1992 | Japan. |
| 4-318067 | 11/1992 | Japan. |
| 4-339861 | 11/1992 | Japan. |
| 5098159-A | 4/1993 | Japan. |
| 5170907-A | 7/1993 | Japan. |
| 5320506-A | 12/1993 | Japan. |
| 5339501-A | 12/1993 | Japan. |
| WO-A-92/01749 | 3/1981 | WIPO. |
| WO 92/01749 | 3/1991 | WIPO. |

*Primary Examiner*—Ralph H. Dean

[57] ABSTRACT

Compositions are provided which comprise a poly (phenylene ether) resin, a poly(arylene sulfide) resin and an ortho ester compound. The compositions can further comprise compatibilizing agents and reinforcing fillers to provide compositions that exhibit low flash molding characteristics. Articles molded from these compositions are useful in the electrical connector industry.

32 Claims, 1 Drawing Sheet

COMPOSITIONS OF POLY (PHENYLENE ETHER), POLY (ARYLENE SULFIDE) AND ORTHO ESTER COMPOUNDS

This is a continuation of application Ser. No. 08/485,759 filed on Jun. 7, 1995, now abandoned.

BACKGROUND OF THE INVENTION

1. Field of the Invention

This invention relates to blends of poly(phenylene ether) and poly(arylene sulfide) resins which exhibit enhanced properties such as ductility.

2. Brief Description of the Related Art

The poly(phenylene ether) resins are a widely used class of thermoplastic engineering resins characterized by excellent hydrolytic stability, dimensional stability, toughness, heat resistance and dielectric properties. However, they are deficient in certain other properties such as solvent resistance.

For their part, poly(arylene sulfide)s are crystalline engineering thermoplastics with high crystalline melting temperatures, typically on the order of 285° C., and are characterized by low flammability, high modulus and excellent resistance to aggressive chemicals and solvents. However, their glass transition temperatures are very low, typically as low as 85° C.; as a consequence, heat distortion temperatures are low in the absence of reinforcement with fillers such as glass fiber. In addition, poly(arylene sulfide) resins are very brittle, as evidenced by a tensile elongation to break for poly(phenylene sulfide) which is usually no greater than about 2.5% and frequently below 1%.

It might be expected that blends containing poly(arylene sulfide)-poly(phenylene ether) resins could be prepared which would have such properties as high solvent resistance, high heat distortion temperature, good ductility and resistance to flammability. However, blends of this type are incompatible and undergo phase separation and delamination, as a result of little or no phase interaction between the two resin phases. Molded parts made from such blends are typically characterized by low tensile and impact strength. Accordingly, there have been numerous methods developed for providing compatibilization between the two resins. These methods generally involve functionalizing the poly(phenylene ether) resin, the poly(arylene sulfide) resin, or both, presumably in order to make copolymers between the two resins. The resultant copolymers are thought to serve as compatibilizers for the remaining poly(phenylene ether) resin and poly(arylene sulfide) resin. Examples of various compatibilized blends of poly(phenylene ether) resins and poly(arylene sulfide) resins can be found in U.S. Pat. Nos. 5,290,881, 5,122,578, 5,292,789, and 4,528,346 as well as EP-341422-A, EP-368413-A, EP491884-A, JP 03121159-A, and JP 04213357-A; all of which are incorporated herein by reference.

Accordingly, an object of the present invention is to provide poly(arylene sulfide) resin/poly(phenylene ether) resin compositions which exhibit desired levels of tensile strength and tensile elongation.

SUMMARY OF THE INVENTION

The needs discussed above have been generally satisfied by the surprising discovery of an improved thermoplastic composition which comprises:

a) a poly(phenylene ether) resin;
b) a poly(arylene sulfide) resin; and
c) an ortho ester compound.

In preferred embodiments, the compositions may additionally comprise functionalizing agents, impact modifiers, fillers, and additives to further enhance the overall properties of the final composition. The description which follows will provide additional details regarding this invention.

DETAILED DESCRIPTION OF THE INVENTION

Figure 1:
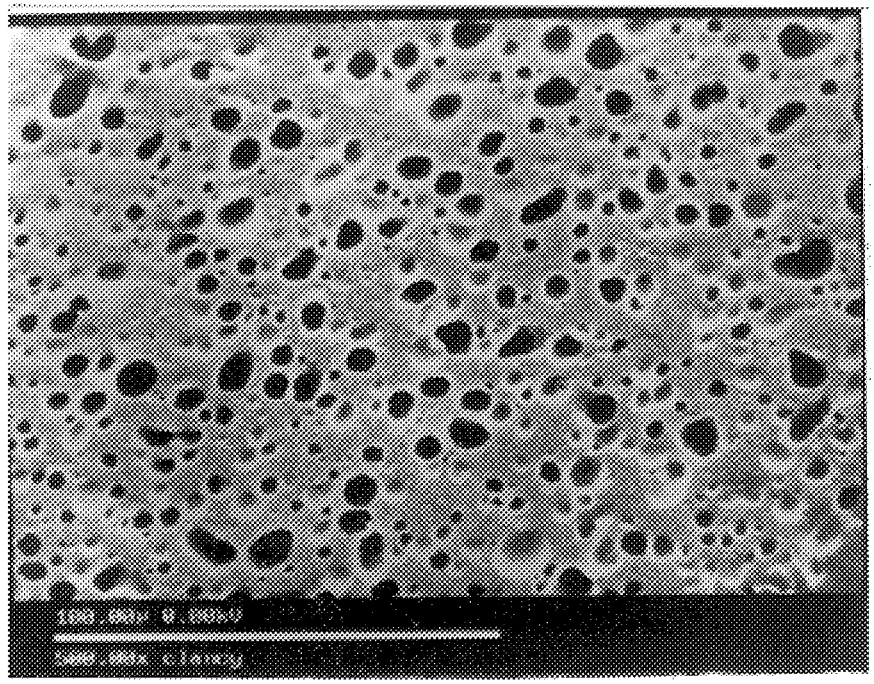
FIG. 1 is a scanning electron micrograph depicting the morphology of Sample 4 containing a poly(phenylene ether) resin functionalized with citric acid and containing a poly (phenylene sulfide) resin, with the poly(phenylene ether) resin particles having an average particle size of about 5 microns.

The poly(phenylene ether) resins (hereinafter known as "PPE") employed in the present invention are known polymers comprising a plurality of structural units of the formula (I)

wherein each $Q^1$ is independently halogen, primary or secondary lower alkyl (i.e., alkyl containing up to about 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. Their intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

For one embodiment of the present invention, it is preferred for at least some of the PPE to be functionalized. Functionalized PPE are those PPE which contain at least one reactive functional group, which may be present on a polymer endgroup or along the backbone of the polymer chain.

One way to functionalize the PPE is by reacting the PPE with at least one olefinic compound used as a functionalizing agent. Typical reagents used to accomplish this functionalization include maleic anhydride, fumaric acid, cinnamic acid, maleimides such as N-phenylmaleimide and 1,4-phenylene-bis-methylene-$\alpha,\alpha'$-bismaleimide, maleic hydrazide, methylnadic anhydride, fatty oils (e.g., soybean oil, tung oil, linseed oil, sesame oil), unsaturated carboxylic acids such as acrylic, crotonic, methacrylic acid and oleic acid, unsaturated alcohols such as allyl alcohol and crotyl alcohol and unsaturated amines such as allylamine and trialkyl amine salts of unsaturated acids such as triethylammonium fumarate and tri-n-butylammonium fumarate. Such typical reagents for preparing a useful functionalized PPE are described in U.S. Pat. Nos. 4,315,086, 4,755,566, and 4,888,397, which are incorporated herein by reference.

It is sometimes advantageous to use an initiator in the reaction of the PPE with the olefinic compound. Suitable initiators for use in the current invention include free radical initiators generally known to the art. Specific initiators include various peroxides and hydroperoxides. Specific examples include benzoyl peroxide, 2,5-di(t-butylperoxy)hexane, dicumyl peroxide, 2,5-dimethyl-2,5-di(t-butylperoxy)hexyne-3 and cumene peroxide, with 2,5,-dimethyl-2,5-di(t-butylperoxy)hexyne-3 being preferred. When it is used, the amount of initiator used can vary from about 0.05 weight percent to about 0.5 weight percent relative to the weight of the PPE.

Non-polymeric aliphatic polycarboxylic acids are also useful for preparing a functionalized PPE. Typical of this group of functionalizers are the non-polymeric aliphatic polycarboxylic acids, acid esters and acid amides represented by the formula (II):

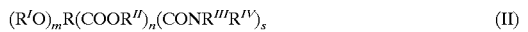

$$(R^{I}O)_{m}R(COOR^{II})_{n}(CONR^{III}R^{IV})_{s} \quad (II)$$

wherein R is a linear or branched chain, saturated aliphatic hydrocarbon from 2 to 20, preferably from from 2 to 10, carbon atoms; $R^{I}$ is selected from the group consisting of hydrogen, or an alkyl, aryl, acyl or carbonyl dioxy group from 1 to 10, preferably from 1 to 6, most preferably from 1 to 4, carbon atoms, especially preferred is hydrogen; each $R^{II}$, is independently selected from the group consisting of hydrogen or an alkyl or aryl group from 1 to 20 carbon atoms, preferably from 1 to 10 carbon atoms; each $R^{III}$ and $R^{IV}$ is independently selected from the group consisting essentially of hydrogen or an alkyl or aryl group from 1 to 10, preferably from 1 to 6, most preferably from 1 to 4, carbon atoms; m is equal to 1 and (n+s) is greater than or equal to 2, preferably equal to 2 or 3, and n and s are each greater than or equal to zero and wherein $(OR^{I})$ is alpha or beta to a carbonyl group and at least two carbonyl groups are separated by 2 to 6 carbon atoms. Obviously, $R^{I}, R^{II}, R^{III}$ and $R^{IV}$ cannot be aryl when the respective substituent has less than 6 carbon atoms.

Illustrative of suitable polycarboxylic acids are citric acid, malic acid, and agaricic acid; including the various commercial forms thereof, such as, for example, the anhydrous and hydrated acids. Illustrative of acid esters useful herein include, for example, acetyl citrate and mono- and/or di-stearyl citrates and the like. Suitable acid amides useful herein include for example N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Suitable functionalizing compounds can be found in U.S. Pat. Nos. 4,315,086, 4,755,566 and 5,000,897, which are incorporated herein by reference.

The amount of the above mentioned functionalizing agent that is required to appropriately functionalize the PPE is that which is sufficient to improve the compatibility between the various components in the composition. An effective amount, based on the amount of the PPE, is generally up to about 8% by weight, and is preferably from about 0.05% to about 4% by weight. In the most preferred embodiments, the amount of the functionalizing agent is in the range from about 0.1% to about 3% by weight based on the amount of the PPE.

In the preparation of a functionalized PPE, it is also sometimes advantageous to employ at least one lubricant which is substantially inert to the functionalizing agent and any other ingredients. The presence of the lubricant decreases the required melt processing temperature to produce the functionalized PPE, as well as the compatibilized blends prepared therefrom. As a result of the decreased melt temperature, gel formation is minimized.

Suitable lubricants will be apparent to those skilled in the art; in general, they are solids with high lubricity or relatively low melting solids or oils. Examples include polytetrafluoroethylene, fatty acid amides as disclosed and claimed in copending, commonly owned application Ser. No. 07/815211 (abandoned), aluminum alkylphosphonates as disclosed and claimed in copending, commonly owned application Ser. No. 07/816629, now U.S. Pat. No. 5,376,714 and hydrogenated poly($\alpha$-olefins) as disclosed and claimed in copending, commonly owned application Ser No. 07/816430 (abandoned) and commonly owned U.S. Pat. Nos. 5,214,099 and 5,281,667, which are incorporated herein by reference.

The hydrogenated poly($\alpha$-olefins) are often preferred. They may be obtained by the catalytic polymerization of $\alpha$-olefins followed by hydrogenation to remove residual unsaturation. The catalysts which may be employed in their preparation include cationic and metathetic catalysts. Methods for preparing hydrogenated poly($\alpha$-olefins) are disclosed, for example, in U.S. Pat. Nos. 4,225,739, 4,282, 392, 4,311,864, 4,319,065, 4,334,113 and 4,409,415, all of which are incorporated herein by reference. The products comprise polymers of various molecular weights, including oligomers.

The most preferred hydrogenated poly(α-olefins) are those having kinematic viscosities of about 2–20 centistokes and especially 8–12 centistokes at 100° C., as determined by ASTM procedure D445. They are commercially available from such companies as Henkel Corporation under the tradename EMERY fluids.

The hydrogenated poly(α-olefins) are generally used in a lubricating amount. The lubricating amount, based on the weight of the PPE, is generally in the range of about 1% to about 5% by weight and preferably about 2% to about 4% by weight.

Another useful method for preparing appropriate functionalized PPE involves reacting PPE with a compound containing an acyl functional group in a non-reactive solvent for PPE. The reacted (capped) PPE may be isolated by conventional techniques, such as precipitation with a non-solvent. Non-limiting examples of these compounds include chloroformyl succinic anhydride, chloroethanoyl succinic anhydride, trimellitic anhydride acid chloride, 1-acetoxyacetyl-3,4-dibenzoic acid anhydride, and terephthalic acid acid chloride. Additional examples and methods to prepare such functionalized PPE can be found in U.S. Pat. Nos. 4,600,741 and 4,642,358, each of which is incorporated herein by reference.

The poly(arylene sulfide) resins (referred to hereinafter as "PPS") used in the present invention are derived from the known polymers containing arylene groups separated by sulfur atoms. The preferred poly(arylene sulfide) resins include various poly(phenylene sulfide)s, for example, poly (p-phenylene sulfide) and substituted poly(phenylene sulfide)s. Typical PPS polymers comprise at least 70 molar %, preferably at least 90 molar %, of recurring units of the following structural formula (III):

When the amount of said recurring units is less than 70 molar %, the heat resistance may be insufficient.

The other 30 molar % or less, and preferably 10 molar % or less, of the recurring units of PPS can be those of the following structural formulae (IV):

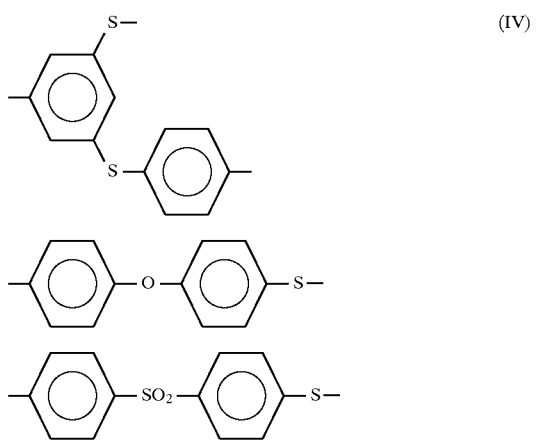

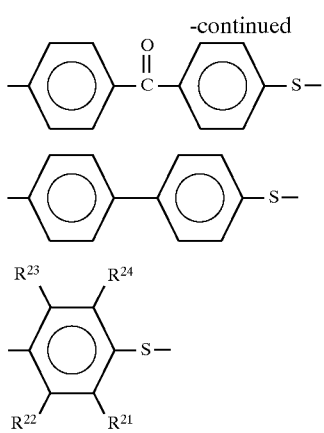

wherein $R^{21}$, $R^{22}$, $R^{23}$ and $R^{24}$ are independently selected from the group consisting of hydrogen, halogen, alkyl, phenyl, alkoxy, aryloxy, nitro, amino, and carboxy groups.

The PPS of the present invention may be linear, branched, or cured polymers, or mixtures of the same. Linear PPS of relatively low molecular weight may be prepared by, for example, a process disclosed in the specification of U.S. Pat. No. 3,354,129, which is incorporated herein by reference. Linear PPS having a relatively high molecular weight may be prepared by, for example, the process disclosed in the specification of U.S. Pat. No. 3,919,177, which is incorporated herein by reference. Branched PPS may be prepared by the use of a branching agent, for example, 1,3,5-trichlorobenzene, which is disclosed in U.S. Pat. No. 4,749,163 and which is incorporated herein by reference. The degree of polymerization of the polymers prepared by the processes of U.S. Pat. Nos. 3,354,129, 3,919,177 and 4,749,163 can be further increased by curing in an oxygen atmosphere or in the presence of a crosslinking agent such as, for example, a peroxide after polymerization.

The PPS may be functionalized or unfunctionalized. If the PPS is functionalized, the functional groups may include, but are not limited to, amino, carboxylic acid, metal carboxylate, disulfide, thio, and metal thiolate groups. One method for incorporation of functional groups into PPS can be found in U.S. Pat. No. 4,769,424, which is incorporated herein by reference, which discloses incorporation of substituted thiophenols into halogen substituted PPS. Another method involves incorporation of chlorosubstituted aromatic compounds containing the desired functionality reacted with an alkali metal sulfide and chloroaromatic compounds. A third method involves reaction of PPS with a disulfide containing the desired functional groups, typically in the melt or in a suitable high boiling solvent such as chloronaphthalene.

The PPS, more specifically, the poly(p-phenylene sulfide) resin, preferably has moieties which will react with an ortho ester group. Suitable reactive groups for the PPS include, for example, amine, thiophenol and acid groups. Various catalysts known in the art may also be useful in affecting reactions between the PPS and the ortho ester group.

Though the melt viscosity of PPS used in the present invention is not particularly limited so far as the blends which can be obtained, a melt viscosity of at least about 100 Poise is preferred from the viewpoint of the toughness of PPS per se and that of about 10,000 Poise or less is preferred from the viewpoint of the injection moldability.

The PPS in this invention may also be treated to remove unwanted contaminating ions by immersing the resin in deionized water or by treatment with an acid, typically hydrochloric acid, sulfuric acid, phosphoric acid or acetic acid as found in Japanese Kokai Nos. 3,236,930-A, 1,774, 562-A, 1,299,872-A and 3,236,931-A, all of which are incorporated herein by reference. For some product applications, it is preferred to have a very low impurity level in the PPS. The impurity level is usually represented as the percent by weight ash remaining after burning a PPS sample. Typically ash contents of the PPS of less than about 1% by weight are desirable, with ash numbers less than about 0.5% by weight preferred and ash numbers less than about 0.1% by weight most preferred.

Addition of an effective amount of at least one ortho ester compound having at least two ortho ester groups to the PPE/PPS compositions, optionally in combination with a reinforcing filler, led to the surprisingly discovery that the resulting compositions had a unique combination of beneficial properties, such as, for example, increased ductility and tensile properties. Additionally, by combining the above components in effective amounts, it is possible to create a resin composition with no flash capabilities when the resin is injection molded. The term "no flash" resin composition is intended to include not only those compositions which exhibit no flash, but also those compositions which exhibit substantially no flash characteristics.

Thus, according to one embodiment of the invention, the ortho ester compound is added in an amount effective to provide a thermoplastic resin composition which exhibits improved physical properties, such as improved tensile properties or reduced flash capabilities over the same composition without an ortho ester compound.

The term "ortho ester" means a compound in which one carbon atom is attached to another by a direct carbon-carbon bond, and to three further carbon atoms through oxygen. Such compounds can be considered to be esters of the hypothetical orthoacids $R—C(OH)_3$, wherein R is an organic radical. The existence of such orthoacids is for the most part unknown, since they immediately dehydrate to conventional carboxylic acids. However, esters of such acids are known and the compositions of this invention include certain polymer substituted esters of this type.

The ortho ester compounds preferably contain ortho ester moieties represented by the formula (V):

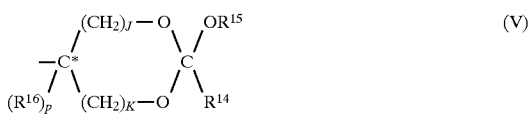

where $R^{15}$ is a $C_{1-4}$ primary or secondary alkyl radical or is an alkylene radical forming a second 5- or 6-membered ring with $C^*$, and $R^{14}$ is a $C_{1-4}$ primary or secondary alkyl or $C_{6-10}$ aromatic radical, or $R^{14}$ and $R^{15}$ together with the atoms connecting them form a 5-, 6- or 7-membered ring;

$R^{16}$ is hydrogen or $C_{1-4}$ primary or secondary alkyl;

K is 0 or 1;

J is from 1 or 2; and p is 0 when $R^{15}$ and $C^*$ form a ring and is otherwise 1.

The $R^{15}$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred.

It is also possible for $R^{15}$ to form a second 5- or 6-membered ring with other portions of the molecule. For this purpose, one of the carbon atoms in the ortho ester ring is designated $C^*$ to indicate its role as part of said second ring.

The $R^{14}$ value may be a $C_{1-4}$ primary or secondary alkyl radical as defined above for $R^{15}$ or a $C_{6-10}$ aromatic (preferably aromatic hydrocarbon) radical. Finally, it is possible for $R^{14}$ and $R^{15}$ together to form a 5-, 6- or 7-membered ring with the atoms connecting them. Thus, the invention includes certain spiro ortho ester-functionalized PPE.

The $R^{16}$ radical may be hydrogen or an alkyl radical similar to $R^{14}$ and $R^{15}$. It is preferably hydrogen.

The values of J and K depend on whether the cyclic ortho ester moiety is a 5-membered or 6-membered ring. In general, 5-membered rings are preferred; that is, K is 0 and J is 1. However, the invention also includes compositions in which a 6membered ring is present, which requires either that J and K both be 1 or that K be 0 and J be 2.

The value of the subscript p also depends on the cyclic structure of the ortho ester moiety. If $C^*$ is part of a ring structure with $R^{15}$, all four valences thereof are satisfied and p will be 0. If this is not the case, p will be 1.

The following is an illustrative ortho ester moiety (VI) which may be present in the ortho ester compound:

and which may also be referred to as a 4-(2-methoxy-2-methyl-1,3-dioxolanyl) radical and is usually preferred. Intermediates for preparation of such compounds include 4-hydroxymethyl-2-methoxy-2-methyl-1,3-dioxolane, which is obtainable by the reaction of glycerol and methyl orthoacetate. An improved method for the preparation of this and structurally related compounds in substantially pure form and the products thus obtained are disclosed in U.S. Pat. No. 5,231,197, which is incorporated herein by reference. The following illustrative ortho ester moiety (VI) may be present in the ortho ester compound:

The above moiety may be referred to as a 4-(1-methyl-2, 6,7-trioxabicyclo[2.2.2]octyl) radical; the methylol derivative thereof can be prepared by the reaction of ethyl orthoacetate with a substantially equimolar amount of pentaerythritol.

The ortho ester compound is typically a liquid or solid ortho ester compound. Ortho ester compounds having a molecular weight from about 200 to about 10,000 are preferred. The preferred ortho ester compounds comprise at least two ortho ester groups per molecule, although the average ortho ester number may be less than 2 per molecule (e.g., the ortho ester compound may be a mixture of ortho ester compounds having a variety of ortho ester groups per molecule). Two or more ortho ester moieties represented by formula (V) can generally be linked by most any group that is stable to the processing conditions for the PPE composition and is not reactive with the ortho ester moiety. Illustrative examples of useful linking groups include: alkyl, cycloalkyl, aryl, esters, amides, heteroaryls such as, for example, triazines, pyridines, pyrimidines, furans, etc., phosphoryl, sulfonyl, dialkylsilicon, and the like. Additional examples of ortho ester compounds useful in this invention include: ortho ester derivatives of bisphenols such as bisphenol A, resorcinol, hydroquinone, pyrocatechol, bisphenol F, tetrabromobisphenol A, tetraphenylolethane, phenol novolaks, o-cresol novolaks, polypropylene glycol, hydrogenated bisphenol A, saligenin, 1,3,5-trihydroxybenzene, trihydroxydiphenyldimethylmethane, 4,4'-dihydroxybiphenyl, 1,5-dihydroxynaphthalene, cashew phenol, dihydroxydiphenylsulfone and 2,2,5,5,-tetrakis(4-hydroxyphenyl)hexane; ortho ester derivatives of halogenated bisphenols; ortho esters such as a bis-ortho ester ether of butanediol; ortho esters such as bis-ortho ester phthalates made the reaction of glycerol ortho ester and phthaloyl chloride. The ortho ester compounds can also contain other groups that are reactive with the PPE, the PPS, or both. The ortho ester compounds may be used singly or as mixtures of two or more.

Ortho ester compounds may also include ortho ester-functional polymers. Examples of such polymer substituted ortho esters include: ortho ester-functional polystyrene and polyolefins (i.e., polyethylene and polypropylene), ortho ester-functional elastomers such as EPR, EPDM, and styrene based block copolymers, ortho ester-functional polysiloxanes, ortho ester-functional polycarbonates, polyimides and polyetherimides, ortho ester-functional polyalkylene glycols and similar ortho ester substituted polymers.

It is possible to obtain compositions that have a marked improvement in chemical resistance to common automotive solvents by combining a functionalized PPE and at least one ortho ester compound with the PPS over comparative compositions comprising unfunctionalized PPE. Thus, according to another embodiment of the invention, a functionalized PPE is used in combination with at least one ortho ester compound and PPS to obtain superior chemical resistance. The ortho ester compound is generally added in an amount sufficient to improve the compatibility between the PPE and PPS. Compatibility is meant to include the minimization of gross phase separation between the components of the blend (i.e., the PPE and the PPS). Indicators of improved compatibilization include, for example, increased tensile elongation, enhanced chemical resistance, reduced delamination tendency, increased ductility and improved phase morphology stabilization. It is through the effect of improving the compatibilization between the blend components which determines, in part, the desirable physical properties of the blend. The amount of the ortho ester compound used depends in part on the molecular weight of the ortho ester compound and the number of active ortho ester species available on the ortho ester compound. When relatively low molecular weight ortho ester compounds are used, relatively low amounts of the ortho ester compound can achieve significantly improved compatibility between the components of the composition. When the ortho ester is attached to a polymer with only a relatively small number of ortho ester groups, a greater amount of the ortho ester compound may be required to obtain the same degree of compatibility between the components of the composition. The amount of the ortho ester compound is typically in the range from about 0.1 weight percent to about 20 weight percent based on the weight of the entire composition.

The invention also includes compositions containing elastomeric impact modifiers compatible with either or both the PPE and the PPS. Impact modifiers for PPE and PPS are typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof. The impact modifier may also be functionalized.

Olefin polymers and copolymers employable in the invention include low density polyethylene (LDPE), high density polyethylene (HDPE), linear low density polyethylene (LLDPE), isotactic polypropylene, poly(l-butene), poly(4-methyl-l-pentene), and the like. Additional olefin copolymers include copolymers of one or more $\alpha$-olefins, particularly ethylene, with copolymerizable monomers including, for example, vinyl acetate, acrylic acids and alkylacrylic acids as well as the ester derivatives thereof including, for example, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include AB and ABA type block, tapered and radial block copolymers and vinyl aromatic-conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K Patent 1,264,741, all incorporated herein by reference. Examples of typical species of AB block copolymers include polystyrene-polybutadiene (SBR), polystyrene-poly(ethylenepropylene), polystyrene-polyisoprene and poly($\alpha$-methylstyrene)-polybutadiene. Such AB block copolymers are available commercially from a number of sources, including Phillips Petroleum under the trademark SOLPRENE, Shell Chemical Co. under the trademark KRATON, and Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include polystyrene-polybutadiene-polystyrene (SBS), polystyrene-polyisoprene-polystyrene (SIS), poly($\alpha$-methyl-styrene)-polybutadiene-poly($\alpha$-methylstyrene) and poly($\alpha$-methylstyrene)-polyisoprene-poly($\alpha$-methylstyrene). Particularly preferred triblock copolymers are available commercially from Shell Chemical Co. under the trademarks CARIFLEX and KRATON and Kuraray under the trademark SEPTON.

Another class of useful impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers (EPDM's) may also be used. They are typified as comprising predominantly ethylene units, a moderate amount of propylene units and up to about 20 mole percent of non-conjugated diene monomer units. They may also contain reactive groups such as acid, oxazoline, ortho ester, epoxy, amine, or anhydride. Many EPDM's and processes for the production thereof are disclosed in U.S. Pat. Nos.

2,933,480, 3,000,866, 3,407,158, 3,093,621 and 3,379,701, which are all incorporated herein by reference.

Other useful impact modifiers include copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (VIII):

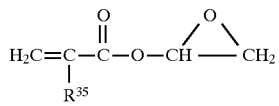

wherein $R^{35}$ represents a hydrogen atom or a lower alkyl group. Examples of the glycidyl esters of α,β-unsaturated acids include glycidyl acrylate, glycidyl methacrylate and glycidyl ethacrylate. The epoxy functional olefinic elastomer is preferably an olefinic copolymer containing of from about 60% to about 99.5% by weight of an α-olefin and of from about 0.5% to about 40% by weight of a glycidyl ester of an α,β-unsaturated carboxylic acid, preferably of from about 3% to about 30% by weight; based on the weight of the elastomer's composition. When this amount is less than about 0.5% by weight, no intended effects can be obtained and when it exceeds about 40% by weight, gelation occurs during melt-blending resulting in degradation of the extrusion stability, moldability and mechanical properties of the product. Suitable epoxy functional α-olefin elastomers include: ethyleneglycidyl acrylate copolymers, ethyleneglycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. The preferred epoxy functional elastomers are available from Sumitomo under the tradenames IGETABOND and BONDFAST and from Elf Atochem under the tradename LOTADER.

Other suitable impact modifiers are the core-shell type graft copolymers. In general, these have a predominantly conjugated diene rubbery core or a predominantly cross-linked acrylate rubbery core and one or more shells polymerized thereon and derived from monoalkylarene and/or acrylic monomers alone or, preferably, in combination with other vinyl monomers. The shells of these impact modifiers may also contain reactive groups, for example, acid, epoxy, oxazoline, ortho ester, amine, or anhydride groups. The core-shell copolymers are widely available commercially in pellet and powder forms, for example, from Rohm and Haas Company as grades including EXL-3330, EXL-3691, EXL-2600, EXL-2607, EXL-2647, EXL-3386, and EXL-3607, and are described in U.S. Pat. Nos. 3,808,180, 4,034,013, 4,096,202, 4,180,494 and 4,292,233.

Also useful are the core-shell copolymers wherein an interpenetrating network of the resins employed characterizes the interface between the core and shell. Especially preferred in this regard are the ASA type copolymers available from GE Plastics under the tradename GELOY resin, and described in U.S. Pat. No. 3,944,631.

In addition, there may be employed the above-described polymers and copolymers having copolymerized therewith or grafted thereon monomers having functional groups and/or polar or active groups. The epoxy functional α-olefin elastomers previously described are an example of this type of useful impact modifier. Finally, other suitable impact modifiers include Thiokol rubber, polysulfide rubber, polyurethane rubber, polyether rubber (e.g., polypropylene oxide), epichlorohydrin rubber, thermoplastic polyester elastomers and thermoplastic poly (ether-ester) and poly (ester-amide) elastomers.

The proportion of impact modifier or other resinous material is subject to wide variation. The amount of impact modifier used is generally an amount sufficient to improve the ductility of the compositions. Impact modifiers such as diblock or triblock copolymers, when utilized, are usually present in an amount up to about 50 parts per 100 parts of PPE. The epoxy functional olefinic elastomers, when utilized, are usually present in an amount up to about 50 parts per 100 parts of PPS. Other impact modifiers may also be present and mixtures of various impact modifiers may also be utilized.

The addition of reinforcing fillers is also contemplated for the compositions of the present invention. Suitable reinforcing fillers are those which increase the rigidity of the blend composition. Amongst these, fibrous materials are preferred, in particular glass fibers made from low alkali E-glass, having a fiber diameter from about 8 μm to about 14 μm. The length of the glass fibers in the finished molded part is typically, for example, from about 0.01 mm to about 0.5 mm. The glass fibers may be employed as rovings or as chopped or milled glass fibers, and may be provided with a suitable finish and an adhesion promoter or promoter system based on silanes. The amount of reinforcing fillers is advantageously from about 5 weight percent to about 60 weight percent, especially from about 10 weight percent to about 40 weight percent based on the total weight of the composition.

Other fibrous reinforcing materials, e.g. carbon fibers, potassium titanate single-crystal fibers, gypsum fibers, wollastonite, aluminum oxide fibers or asbestos may also be utilized. Non-fibrous fillers, e.g. glass beads, hollow glass beads, talcs, micas, chalks, quartzes and natural or calcined kaolins are further preferred fillers, as are combinations of these materials with glass fibers. Like the glass fibers, these latter fillers may be provided with a finish and/or an adhesion promoter or adhesion promoter system. The combination of a non-fibrous filler that also has a platey structure, e.g. talcs, micas and platey kaolins, with glass fibers is especially preferred for some applications to reduce the anisotropic properties of the final composition due to alignment of the glass fiber with the direction of the mold filling during processing. The amount of non-fibrous filler can range from 0% to about 50% by weight based on the total weight of the entire composition.

The compositions of the present invention may also contain at least one polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (IX):

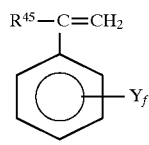

wherein $R^{45}$ is hydrogen, lower alkyl or halogen; γ is hydrogen, vinyl, halogen or lower alkyl; and f is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–65% styrene and about 2–35% diene monomer. These rubber modified polystyrenes include high impact polystyrene (commonly referred to as "HIPS"). Non-elastomeric block copolymer compositions of styrene and butadiene can also be used that have linear block, radial block and tapered block copolymer architectures. They are commercially available from such companies as Fina Oil under the trademark FINACLEAR resins and from Phillips Engineering Resins under the trademark K-RESINS.

The alkenylaromatic compound when present is generally used in the range from about 1% to about 25% by weight and preferably from about 5% to about 15% by weight; based on the weight of the total composition.

The compositional ratios of the present invention, all, except the functionalizing agent, of which are expressed as percentages by weight of the total composition, can range from a level from about 5% to about 95% by weight of PPE resin, about 5% to about 95% by weight of PPS, up to about 20% by weight of ortho ester compound, and further comprise up to about 8% by weight of a functionalizing agent based on the weight of the PPE; up to about 20% by weight of functional elastomer, up to about 20% by weight of elastomeric block copolymer, and up to about 25% by weight of alkenyl aromatic polymer.

The composition preferably comprises PPE at a level, expressed as percentages by weight of the total composition, from about 5% to about 95% by weight, more preferably between about 25% to about 40% by weight, and most preferably from about 30% to about 35% by weight. The composition preferably comprises the PPS at a level, expressed as percentages by weight of the total composition, from about 5% to about 95% by weight, more preferably from about 40% to about 65% by weight, and most preferably from about 50% to about 60% by weight. The composition preferably comprises the ortho ester compound at a level, expressed as percentages by weight of the total composition, from about 0.1% to about 15% by weight, more preferably from about 0.1% to about 10 10% by weight, and most preferably from about 0.5% to about 8% by weight. The composition preferably comprises the functionalizing agent at a level, expressed as percentages by weight of the PPE, up to about 8% by weight, more preferably from about 0.05% to about 4% by weight, and most preferably from about 0.1% to about 3% by weight. The composition preferably comprises at least one impact modifier at a level, expressed as percentages by weight of the total composition, from about 2% to about 18% by weight, more preferably from about 3% to about 10% by weight, and most preferably from about 4% to about 7% by weight Preferably PPS and PPE are in a weight ratio of between about 75:25 and about 30:70, more preferably between about 70:30 and about 50:50, and most preferably between about 70:30 and about 60:40. Preferably the epoxy functional elastomer and the elastomeric block copolymer are in the composition in a weight ratio of between about 15:2 and about 5:10, more preferably between about 12:3 and about 6:6, and 25 most preferably between about 10:6 and about 7:5. Preferably the combined total weight percent, expressed as percentages by weight of the total composition, of epoxy functional elastomer and elastomeric block copolymer in the composition is between about 5% and about 21% by weight, more preferably between about 8% and about 16% by weight, and most preferably between about 10% and about 14% by weight Preferably the composition is free of additional resin materials such as polyesters, polyimides, polyamides and polycarbonate resins. Determination of an exact ratio of components in a composition is, in part, determined by the intended ultimate end-use application of the composition and the necessary properties needed for the application.

The present compositions exhibit improvements in tensile strength and tensile elongation, two properties which are critical for many electronic part applications. The compositions may further exhibit no flash characteristics and high chemical resistance. Other advantageous properties exhibited by the present compositions include low coefficient of thermal expansion, low moisture absorption, high heat distortion temperature and long term heat stability. Furthermore, the present compositions exhibit enhanced impact resistance and ductility.

The compositions may contain or be free of conventional additives such as plasticizers, pigments, dyes, lubricants, mold release agents, stabilizers, antioxidants, or crystallization nucleants.

Preparation of the compositions of the present invention is normally achieved by melt blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition. The compositions of the present invention are useful for making molded articles such as housings for electrical connectors in under-the-hood automotive applications, and are useful for making various other molded articles.

EXAMPLES

The compositions of Table I were extruded on a Welding Engineers twin-screw extruder at a temperature of about 275°–300° C. with a vacuum of 10–20 inches Hg applied to the melt during compounding. The resultant compositions were molded using an Engel injection molding machine using a temperature set of about 290°–300° C. and a mold temperature of about 120°–130° C. All the compositions were tested for tensile strength and tensile elongation at break according to ASTM D638.

The actual extrusion conditions employed may affect the physical properties of the resultant blend. In a preferred embodiment of the present invention it is advantageous to premix the PPE with the functionalizing agent to form a functionalized PPE. The functionalized PPE can then be mixed with the remaining ingredients to form the final composition. By functionalizing the PPE before adding the ortho ester compound it is thought that reaction of the functionalizing agent with the ortho ester compound can be avoided until after the desired reaction between the functionalizing agent and the PPE can be achieved. Premixing the PPE with the functionalizing agent before mixing with the ortho ester compound also maximizes the utilization of the functionalizing agent to functionalize the PPE. The preparation of the functionalized PPE can be accomplished in several ways. In one embodiment of the present invention, a functionalized PPE is made by intimately admixing the functionalizing agent with the PPE without the ortho ester compound present in a separate processing step. In a subsequent processing step any remaining ingredients, including the ortho ester compound, are intimately admixed. In another embodiment, a single extruder that has at least two ports for introduction of ingredients is utilized. The PPE and the functionalizing agent are introduced into the throat of the extruder (first port) and compounded. Simultaneously, additional ingredients are introduced into ports downstream of the first port and the compounding continued. Each portion of the extruder is preferably vacuum vented. Typical compounding temperatures are in the range from about 275°–340° C.

The materials used in the following examples were as follows:

PPE is poly(2,6-dimethylphenylene ether) resin having an intrinsic viscosity of about 0.46 dl/gm measured in chloroform at 25 ° C., obtained from GE Plastics.

PPE-CA is a nucleophile-containing PPE prepared by extruding 3% by weight citric acid with PPE. The PPE-CA was dried at about 110 ° C. prior to use.

PPS is a branched PPS.

OE-1 is an ortho ester compound derived from glycerol ortho ester and terephthaloyl chloride.

Table I contains illustrative examples of blends containing a PPE, PPS, and an ortho ester compound. The compositions had a weight ratio of PPS to PPE or PPE-CA of about 63:37 with the amount of ortho ester given as percentages by weight based on the sum of the PPS and PPE or PPE-CA.

TABLE I

| sample | PPE type | ortho ester | Tensile str.[a] | Elg.[b] |
|---|---|---|---|---|
| 1 | PPE | 0 | 8310 | 5.2 |
| 2 | PPE | 1 | 9661 | 6.5 |
| 3 | PPE | 3 | 10590 | 7.2 |
| 4 | PPE-CA | 0 | 7242 | 4.4 |
| 5 | PPE-CA | 1 | 9057 | 5.6 |
| 6 | PPE-CA | 3 | 9313 | 5.7 |

[a]Tensile strength in psi.
[b]Tensile elongation in %.

As indicated by the data in Table I, blends of PPS and PPE or PPE-CA show a surprising improvement in both tensile strength and tensile with the addition of an ortho ester compound. For example, comparison of the tensile data for sample 2 containing an ortho ester compound to sample 1, a control without an ortho ester compound, illustrates the increase in tensile strength of over 1300 psi with the addition of 1 weight percent of an ortho ester compound to the composition of sample 1. Addition of 3 weight percent of an ortho ester compound to the composition of sample 1 illustrates an even greater increase in tensile strength of about 2300 psi. Increases in tensile elongation are also observed with the addition of an ortho ester compound.

Figure 2:
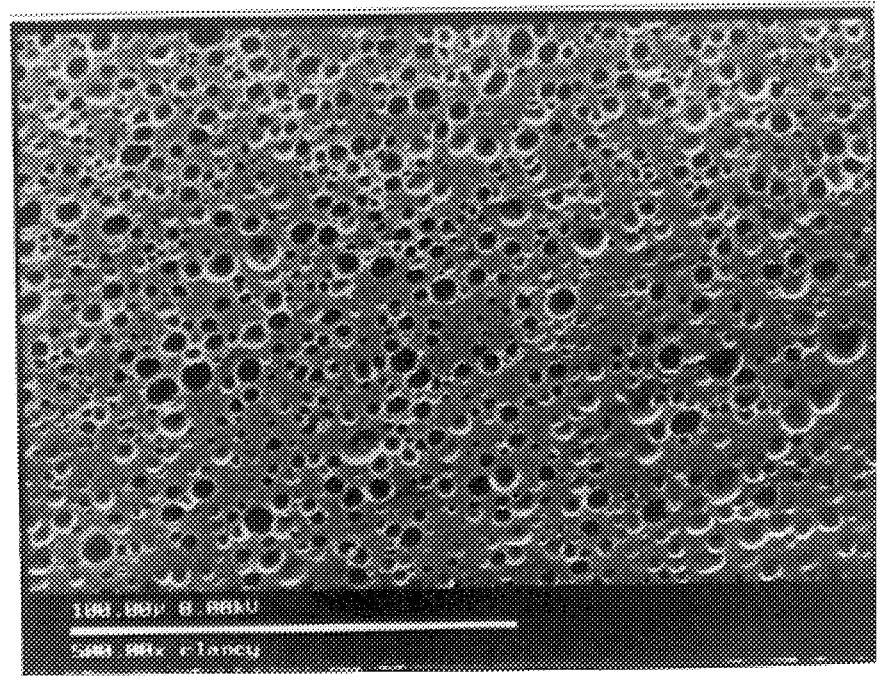
FIG. 2 is a scanning electron micrograph depicting the morphology of Sample 5 containing a poly(phenylene ether) resin functionalized with citric acid and containing a poly (phenylene sulfide) resin and an ortho ester compound, with the poly(phenylene ether) resin particles having an average particle size of about 3.5 microns.

As another indication of the improvements obtained with the addition of an ortho ester compound to PPS and PPE compositions, scanning electron micrographs were taken for several samples. FIG. 1 is a scanning electron micrograph depicting the morphology of Sample 4 PPS and PPE functionalized with citric acid, with the PPE particles having an average particle size of about 5 microns. FIG. 2 is a scanning electron micrograph depicting the morphology of Sample 5 containing PPS and PPE functionalized with citric acid and containing an ortho ester compound, with the PPE particles having an average particle size of about 3.5 microns. The reduction in PPE particle size and the improvement in PPE particle uniformity are additional indicators of improved compatibility between PPS and PPE.

We claim:

1. A composition consisting of:
   (a) a poly(phenylene ether) resin;
   (b) a poly(arylene sulfide) resin; and
   (c) an ortho ester compound.

2. The composition of claim 1, wherein the ortho ester compound comprises a solid or liquid ortho ester compound containing at least two ortho ester groups.

3. The composition of claim 2, wherein, based on the total weight of the composition, the poly(phenylene ether) resin is present at a level from about 5% to about 95% by weight and the poly(arylene sulfide) resin is present at a level from about 5% to about 95% by weight.

4. The composition of claim 3, wherein the ortho ester compound is present in an amount effective to provide a composition which exhibits improved physical properties over the same composition without the ortho ester compound.

5. The composition of claim 4, wherein the ortho ester compound comprises ortho ester moieties of the formula:

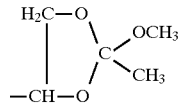

6. The composition of claim 4, wherein the ortho ester compound comprises ortho ester moieties of the formula:

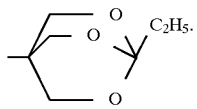

7. The composition of claim 1 further comprising a functionalized poly(phenylene ether) resin.

8. A composition consisting of:
   (a) a poly(phenylene ether) resin;
   (b) a poly(arylene sulfide) resin;
   (c) an ortho ester compound; and
   (d) at least one functionalizing agent in amount up to about 8% by weight based on the weight off the poly(phenylene ether) resin.

9. The composition of claim 8, wherein the functionalizing agent is selected from the group consisting of functionalized olefinic compounds and non-polymeric polycarboxylic acids.

10. A composition consisting of:
    (a) a poly(phenylene ether) resin;
    (b) a poly(arylene sulfide) resin;
    (c) an ortho ester compound; and
    (d) at least one reinforcing filler.

11. The composition of claim 10, wherein the reinforcing filler is present at a level from about 2% to about 50% by weight based on the total weight of the composition.

12. The composition of claim 11, wherein the reinforcing filler is selected from the group consisting of glass fibers, carbon fibers, potassium titanate single crystal fibers, aluminum oxide fibers, glass beads, hollow glass beads, wollastonites, talcs, micas, chalks, quartzes, natural kaolins, calcined kaolins, and mixtures thereof.

13. An article made from a composition consisting of:
    (a) a poly(phenylene ether) resin;
    (b) a poly(arylene sulfide) resin; and
    (c) an ortho ester compound.

14. A method for making a composition consisting of: intimately admixing a poly(phenylene ether) resin, a poly(arylene sulfide) resin, and an ortho ester compound.

15. A composition consisting of:
    (a) a functionalized poly(phenylene ether) resin;
    (b) a poly(arylene sulfide) resin; and (c) an ortho ester compound.

16. A composition consisting of:

(a) a functionalized poly(phenylene ether) resin;

(b) a poly(arylene sulfide) resin;

(c) an ortho ester compound; and (d) at least one reinforcing filler.

17. A composition consisting of:

(a) a poly(phenylene ether) resin;

(b) a poly(arylene sulfide) resin; and (c) a reaction product of a poly(phenylene ether) resin, a poly(arylene sulfide) resin, and an ortho ester compound.

18. A composition consisting of:

(a) a poly(phenylene ether) resin;

(b) an unfunctionalized poly(arylene sulfide) resin; and (c) a reaction product of a poly(phenylene ether) resin, an unfunctionalized poly(arylene sulfide) resin, and an ortho ester compound.

19. An article made from a composition consisting of:

(a) a poly(phenylene ether) resin;

(b) an unfunctionalized poly(arylene sulfide) resin; and (c) an ortho ester compound.

20. A method for making a composition consisting of:

intimately admixing a poly(phenylene ether) resin, an unfunctionalized poly(arylene sulfide) resin, and an ortho ester compound.

21. A composition consisting of:

(a) a poly(phenylene ether) resin;

(b) an unfunctionalized poly(arylene sulfide) resin;

(c) a ortho ester compound; and (d) at least one reinforcing filler.

22. A composition consisting of:

(a) a functionalized poly(phenylene ether) resin;

(b) an unfunctionalized poly(arylene sulfide) resin;

(c) an ortho ester compound; and (d) at least one reinforcing filler.

23. A composition consisting of:

(a) a poly(phenylene ether) resin;

(b) an unfunctionalized poly(arylene sulfide) resin; and (c) an ortho ester compound.

24. The composition of claim 23, wherein the ortho ester compound comprises a solid or liquid ortho ester compound containing at least two ortho ester groups.

25. The composition of claim 24, wherein, based on the total weight of the composition, the poly(phenylene ether) resin is present at a level from about 5% to about 95% by weight and the poly(arylene sulfide) resin is present at a level from about 5% to about 95% by weight.

26. The composition of claim 25, wherein the ortho ester compound is present in an amount effective to provide a composition which exhibits improved physical properties over the same composition without the ortho ester compound.

27. The composition of claim 26, wherein the ortho ester compound comprises ortho ester moieties of the formula:

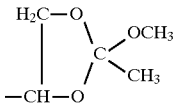

28. The composition of claim 26, wherein the ortho ester compound comprises ortho ester moieties of the formula:

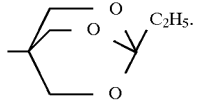

29. The composition of claim 23 further comprising a functionalized poly(phenylene ether) resin.

30. The composition of claim 23, further comprising at least one reinforcing filler present at a level from about 2% to about 50% by weight based on the total weight of the composition.

31. The composition of claim 30, wherein the reinforcing filler is selected from the group consisting of glass fibers, carbon fibers, potassium titanate single crystal fibers, aluminum oxide fibers, glass beads, hollow glass beads, wollastonites, talcs, micas, chalks, quartzes, natural kaolins, calcined kaolins, and mixtures thereof.

32. The composition of claim 23, further comprising at least one alkenyl aromatic polymer.

* * * * *